US009319956B2

(12) United States Patent
McManus et al.

(10) Patent No.: US 9,319,956 B2
(45) Date of Patent: Apr. 19, 2016

(54) METHOD AND APPARATUS FOR MAINTAINING COMMUNICATIONS CONNECTIONS OVER A DISTRIBUTED WIRELESS NETWORK

(75) Inventors: Brian D. McManus, Rochester, MN (US); Andrew T. Thorstensen, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 2458 days.

(21) Appl. No.: 12/014,142

(22) Filed: Jan. 15, 2008

(65) Prior Publication Data

US 2009/0180444 A1 Jul. 16, 2009

(51) Int. Cl.
*H04W 4/00* (2009.01)
*H04W 36/30* (2009.01)
*H04W 40/08* (2009.01)
*H04W 8/26* (2009.01)
*H04W 84/12* (2009.01)

(52) U.S. Cl.
CPC .............. *H04W 36/30* (2013.01); *H04W 40/08* (2013.01); *H04W 8/26* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 6,721,565 | B1* | 4/2004 | Ejzak et al. | 455/436 |
| 6,782,261 | B1* | 8/2004 | Ahmed et al. | 455/436 |
| 2005/0013276 | A1* | 1/2005 | Ekl et al. | 370/332 |
| 2005/0254474 | A1* | 11/2005 | Iyer et al. | 370/338 |
| 2006/0251067 | A1* | 11/2006 | DeSanti et al. | 370/389 |
| 2007/0038719 | A1* | 2/2007 | Brown et al. | 709/207 |
| 2007/0121624 | A1* | 5/2007 | Kimbrough et al. | 370/389 |
| 2007/0153758 | A1* | 7/2007 | Kang et al. | 370/338 |
| 2008/0052779 | A1* | 2/2008 | Sinha et al. | 726/22 |
| 2008/0232326 | A1* | 9/2008 | Lindoff et al. | 370/332 |
| 2008/0295144 | A1* | 11/2008 | Cam-Winget et al. | 726/1 |
| 2008/0301773 | A1* | 12/2008 | Achtari et al. | 726/3 |
| 2009/0003277 | A1* | 1/2009 | Uppili | 370/331 |
| 2009/0119776 | A1* | 5/2009 | Palnitkar et al. | 726/25 |
| 2009/0143093 | A1* | 6/2009 | Somasundaram et al. | 455/525 |
| 2009/0327694 | A1* | 12/2009 | Sood et al. | 713/150 |
| 2010/0296441 | A1* | 11/2010 | Barkan | 370/328 |

OTHER PUBLICATIONS

Ishibashi et al., "A Proprosal of Fast Vertical Handover by Virtual MAC Address Scheme on Mobile Ethernet", Apr. 28, 2004, by Local and Metropolitan Area Network, 2004. Lanman 2004. The 13th IEEE Workshop. Pages citation&abstract and 145-149.*

Daniel Aguayo et al., "MIT Roofnet Implementation", published on the World Wide Web at http://pdos.csail.mit.edu/roofnet/design/ (Aug. 2003).

(Continued)

*Primary Examiner* — Bunjob Jaroenchonwanit
(74) *Attorney, Agent, or Firm* — Roy W. Truelson

(57) ABSTRACT

A mobile wireless device connects to a network of multiple wireless transceiver stations using a protocol in which a connection is established with a particular transceiver station. If the mobile device moves out of range of the original station, the connection is passed to another station, which then impersonates the original station, without dropping the connection. Preferably, the original station provides a virtual Media Access Control (MAC) address to identify itself when the connection is established, and this virtual MAC address is passed to any successor station. Preferably, the station monitors signal strength and automatically passes the connection by polling its neighbors upon determining that signal strength is getting weak.

20 Claims, 9 Drawing Sheets

(56) References Cited

OTHER PUBLICATIONS

John Bicket et al., "Architecture and Evaluation of an Unplanned 802.11b Mesh Network", MobiCom '05 (Aug.-Sep. 2005).
IEEE, "IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1", IEEE, Feb. 28, 2006. [Selected pages cited in Taiwan office action: p. 1, 13, 17-18, 50-55, 128-145].
IEEE, "IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1", IEEE, Feb. 28, 2006. [Full document].
Wenhua Jiao et al, "Fast Handover Scheme for Real-Time Applications in Mobile WiMAX", IEEE 2007.

* cited by examiner

METHOD AND APPARATUS FOR MAINTAINING COMMUNICATIONS CONNECTIONS OVER A DISTRIBUTED WIRELESS NETWORK

FIELD OF THE INVENTION

The present invention relates to the use of wireless communications networks, and in particular to the maintenance of a wireless communications connection between a distributed network of servers and a client under circumstances wherein the relative signal strength of the client changes, e.g., where the client is mobile.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users. At the same time, the cost of computing resources has consistently declined, so that information which was too expensive to gather, store and process a few years ago, is now economically feasible to manipulate via computer. The reduced cost of information processing drives increasing productivity in a snowballing effect, because product designs, manufacturing processes, resource scheduling, administrative chores, and many other factors, are made more efficient.

Communication at various levels is a necessary ingredient of the information revolution. Not only should people be able to communicate immediately, directly, and without limitations, over long distances (by telephone, radio, etc.), but digital computing devices should also be able to communicate with one another. The reduced cost of computing and the general availability of digital devices has brought an explosion in the volume of information stored in such devices. The volume of information dwarfs the storage capability of any one device, making it desirable to facilitate wide access to information stored among different computer systems. To improve information access, various techniques for allowing computing devices to communicate and exchange information with one another have been developed. Perhaps the most outstanding example of this distributed computing is the World Wide Web (often known simply as the "web"), a collection of resources which are made available throughout the world using the Internet. People from schoolchildren to the elderly are learning to use the web, and finding an almost endless variety of information from the convenience of their homes or places of work. Businesses, government, organizations and even ordinary individuals are making information available on the web, to the degree that it is now the expectation that anything worth knowing about is available somewhere on the web.

Early communications media, whether for human voices or for digital data, have generally relied on fixed communications stations. But as the need to communicate information has grown, it has become manifestly desirable to enable communications with mobile communications devices. Mobile communications can involve communications between an isolated pair of mobile devices, but in particular it has been desirable to enable a mobile communications device to link to a large network which couples it, by a series of wired and/or wireless links, to many other devices (either mobile or fixed). One outstanding example of such communications is the a mobile cell phone, which is coupled to a worldwide telephone network by which it is possible to place or receive a telephone call with another telephone, either mobile or fixed, nearly anywhere in the world. Another outstanding example is a laptop, palmtop or other mobile digital computing device, connected via a wireless connection (e.g., an IEEE 802.11 protocol connection) to the Internet, whereby it may send and receive data over the Internet from any other device in the world coupled to the Internet.

Wireless Internet, cell phones, and other wireless network connections have generally followed a common paradigm. Due to greater bandwidth, the backbone of the network is generally a fixed tangible transmission medium, such as copper wires, fiber-optic cable, and so forth, running between fixed routers or other network nodes. Multiple wireless transceiver stations in fixed, dispersed locations are coupled to the tangible transmission medium network. Each wireless transceiver station has a respective range for communicating with mobile wireless devices. To connect to the network, a mobile wireless device determines the presence of a wireless transceiver station within range and establishes a connection with that wireless transceiver station, according to a pre-established protocol. Ideally, the wireless transceiver stations are located to provide coverage over a desired area, i.e., so that a mobile device is within range of at least one such transceiver station, wherever the mobile device is currently located within the desired area of coverage.

For a certain class of communications protocols, the mobile device (referred to as a client) discovers an appropriate wireless transceiver station and establishes a connection with that particular station (acting as a server). As part of the protocol, the client addresses communications to the particular wireless transceiver station with which the connection was established. Once the connection is established, the client is free to move about within the range of the station's transceiver, and the connection will be maintained. However, if the client moves out of range of the transceiver station with which it established a connection, the connection may be dropped, notwithstanding that the device may be within range of a different transceiver station, unless the applicable protocol and the wireless device. If the connection is dropped, the client must then re-establish a new connection with the new transceiver station.

This problem of losing of a connection as a mobile device moves out of range is well known in the cell phone industry, wherein certain special protocols exist to hand off a connection from one cell phone tower to another as a cell phone moves out of range of the tower with which the connection was originally made. In the case of an IEEE 802.11 protocol and certain similar protocols, the range of the transceiver station is typically much shorter, and hence the restriction on mobility is potentially more severe. However, this is accepted in most cases because the mobile device is often used in a stationary manner. I.e., a laptop computer may be carried around from one location to another, but in use it is typically placed on a desk, and remains at that location during a particular communications session. Thus, the relatively short range of the transceiver station is often not a problem. When a user wishes to initiate a session, he finds a transceiver station within range, and stays at that location for the duration of the session.

Notwithstanding these "typical" behaviors, there are numerous reasons, not always fully appreciated, why it would be desirable to provide a continuous wireless connection which is not limited to the range of any particular wireless transceiver station. In the first place, dropped connections are an annoyance, even if they don't happen often enough to make communications impossible or impractical. Secondly, while digital computing devices using relatively short range IEEE 802.11 or similar wireless connections are often operated in a stationary manner, there are not always stationary, and it is sometimes desirable to maintain the connection while the digital computing device is moving. But even more significantly, extending the range of wireless transceiver stations to reduce the frequency of dropped connections has unwanted side-effects. It means either greater overlap of coverage or a larger number of devices supported by each transceiver station, or both. These circumstances can limit the bandwidth supported by the network, because each wireless transceiver station must support a large area, i.e., one having many devices within it. Put another way, a larger number of transceiver stations, each having a smaller coverage area, can generally support a higher communications bandwidth than a smaller number of stations each having a larger coverage area.

As the number of mobile communications devices increases, and the volume of data transmitted to and from mobile devices increases, there is a need to find improved methods of communicating with mobile devices which support greater bandwidths of data transfer and greater freedom of movement for people and devices.

SUMMARY OF THE INVENTION

A mobile wireless device connects to a network of multiple wireless transceiver stations using a protocol in which a connection is established with a particular transceiver station. If the mobile device moves out of range of the wireless transceiver station with which the connection was established, the connection is passed from one wireless transceiver station to another, which then impersonates the original wireless transceiver station to the mobile wireless device, without dropping the connection.

In the preferred embodiment, when establishing an initial connection with a mobile wireless device as a client, a wireless transceiver station (as a server) generates a virtual Media Access Control (MAC) address to identify itself to the client. The client thereafter considers the connection made between itself and the device identified by the virtual MAC address, i.e. all outgoing wireless transmissions are addressed to the virtual MAC address, and incoming transmissions are identified as coming from that address. The server station continually or periodically monitors the signal strength of the connection. Upon determining that the signal may be getting weak (indicating that the mobile client may be moving out of range), the server station requests its neighboring server stations to report signal strength with the client. Each neighboring station then briefly assumes the role of the original station and attempts to communicate with the client. If the attempt is successful, signal strength at the neighboring station is evaluated, and reported to the original requesting server station. Alternatively, each neighboring station continually monitors signal strength of all wireless devices within its range, and reports based on recent monitoring. After receiving one or more reports, the original server may then determine that a neighboring server has a better wireless connection. In this event, it requests the neighboring server to assume service of the connection. The neighboring server then assumes service of the connection, using the virtual MAC address generated by the original server when the connection was made. This process of passing off the connection to another neighboring server may continue indefinitely.

The present invention is not limited to any particular network application, but in an exemplary embodiment, the wireless transceiver stations are coupled to the Internet, and provide an Internet connection to the mobile wireless device, which may be, e.g., a laptop computer, personal digital assistant (PDA), or other device.

Providing a continuous wireless connection with a mobile client from multiple wireless transceiver stations (as servers) makes it practical to use transceiver stations having small respective coverage areas, thereby increasing the potential communication bandwidth supported by the network of server stations. I.e., in general, a larger number of stations, each supporting a smaller area of coverage, can support greater communication bandwidth with a fixed pool of mobile clients than a smaller number of stations, each supporting a larger area of coverage. The smaller area of coverage generally means that each station supports a smaller number of clients, and thus is able to provide greater bandwidth to each one. Furthermore, although a larger number of transceiver stations may be required, the reduction in required range of the wireless transceivers will offset the cost of additional transceiver stations. In fact, the shorter range and possibility of using mass produced commodity devices as transceiver stations may well prove to provide a wireless network which is cheaper to build and maintain in the long run. An additional benefit is that, because the stations are closer together, the clients generally do not have to transmit signals as far, and thus there is a potential for reducing power consumption within the clients. At the same time, a continuous wireless connection technique in accordance with the preferred embodiment does not require any alteration to conventional clients, which are unaware that server connections are being passed on to different physical transceiver devices. As a result, such a network can support and continue to support client devices already in use.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
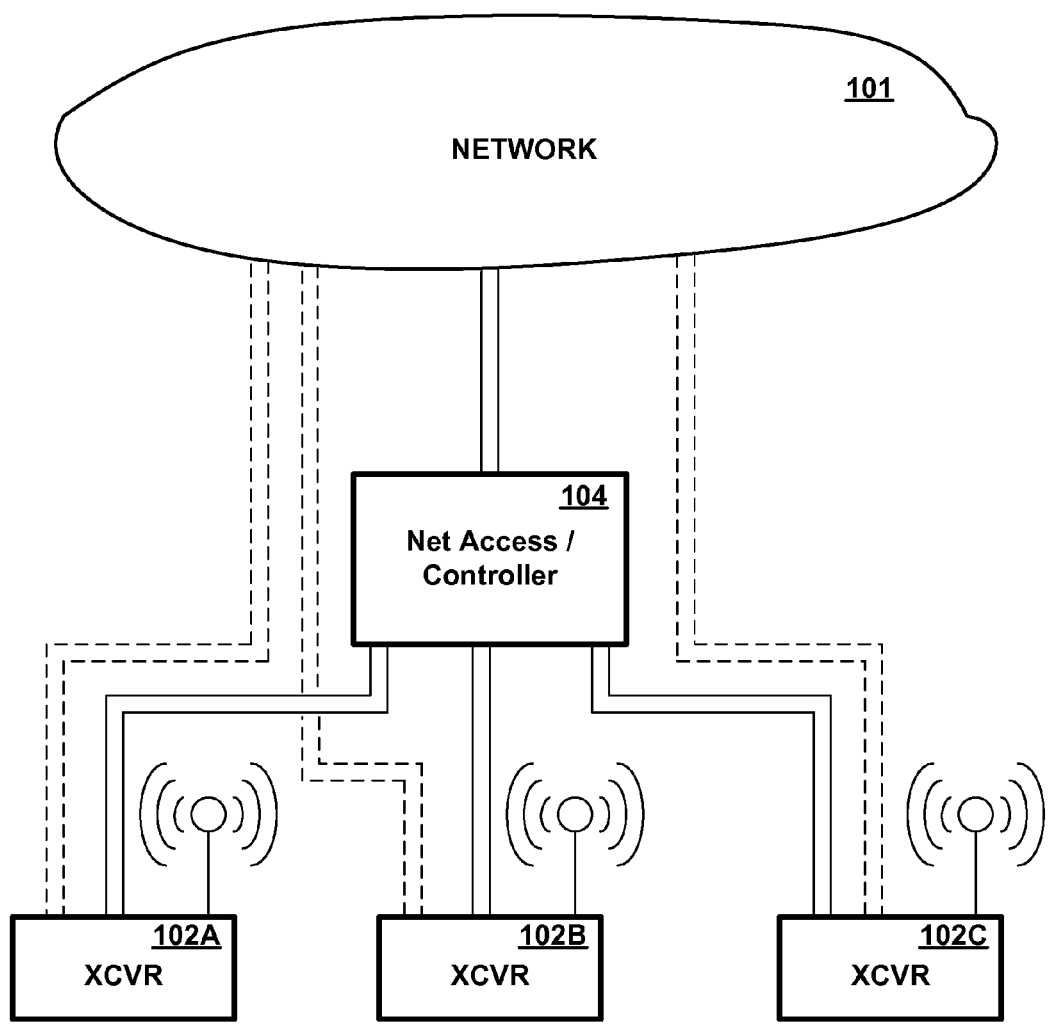
FIG. 1 is a high-level illustration of the major components of a network environment for maintaining a connection to a mobile wireless device, according to the preferred embodiment of the present invention.

Referring to the Drawing, wherein like numbers denote like parts throughout the several views, FIG. 1 is a high-level illustration of an exemplary network environment, showing some of the major components involved in a system which automatically maintains a network connection with a mobile wireless device even as the mobile wireless device moves out of range of a wireless transceiver station, in accordance with the preferred embodiment of the present invention. As shown in FIG. 1, a network 101 is coupled to a network access device 104, which may also function as a controller, which is in turn coupled to multiple wireless transceiver stations 102A-C (herein generically referred to as feature 102), each having a different respective physical location. Although three transceiver stations are shown for illustrative purposes in FIG. 1, it will be understood that the number of stations may vary, and would typically be larger. Mobile wireless device 103 communicates with one or more of transceiver stations 102 by wireless transmission in order to access network 101.

Network 101 may be any network used to transmit information from one device to another. In an exemplary embodiment, network 101 is the Internet. In this exemplary embodiment, each transceiver station 102 accesses network 101 through a common network access device 104. However, it would alternatively be possible for each station 102 to directly access the network or to access a different respective network access device, as depicted in FIG. 1 by the dashed line connections running between each station 102 and network 101. Mobile wireless device 103 could be any mobile digital data device for communicating over the Internet, such as a laptop computer, a personal digital assistant (PDA), or the like. Although an exemplary network environment is disclosed, the present invention is not limited to this environment.

In the preferred embodiment, each wireless transceiver station 102 has a different respective fixed physical location (although fixed, it may on rare occasions be re-positioned). The station is preferably coupled to network access device 104 via a physical link, such as copper wire, fiber-optic cable, and so forth. However, the station could alternatively be coupled to network access device 104 via a wireless connection. For simplicity of illustration, these connections are represented in FIG. 1 as direct couplings. However, it will be understood that a wireless transceiver station may be coupled to a network access device via one or more other devices and links, of which all, some or none may be wireless links. Furthermore, while it is preferred that the position of the wireless transceiver station be fixed, it would alternatively be possible for the station itself to be mobile.

In the preferred embodiment, each wireless transceiver station 102 functions independently and discovers the identities and locations of other transceiver stations within range (neighbor transceiver stations) in a peer-to-peer communication process, as described in greater detail herein. However, it would alternatively be possible for network access device 104, or a separate device acting as a controller, to maintain information regarding neighbors, for purposes of switching a wireless connection with mobile device 103 from one transceiver station to another.

Wireless device 103 communicates with a wireless transceiver station 102 by establishing a wireless communications session, herein referred to as a "connection", according to a pre-defined protocol, and subsequently transmitting and/or receiving information while the connection is active. If the connection is lost for any reason, it must be re-established. In the preferred embodiment, information between wireless device 103 and transceiver station 102 is exchanged in packets, each packet having a header containing identifying information, although a packet-based protocol is not necessarily required. Any appropriate wireless transmission technology and protocol which requires the establishment of a connection between two devices, now known or hereafter developed, may be employed. For example, the IEEE 802.11 protocol may be used.

Figure 2:
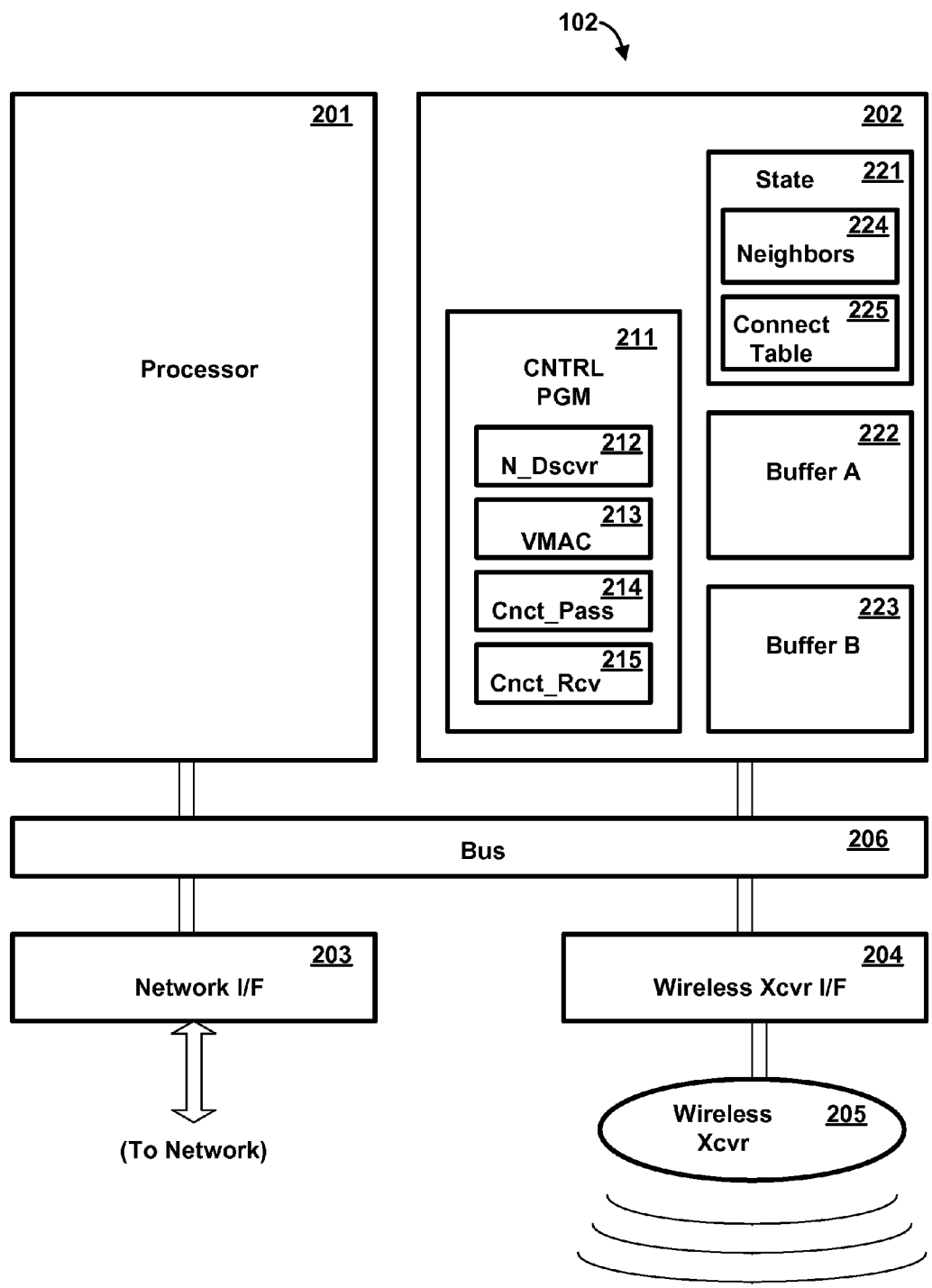
FIG. 2 is a high-level block diagram of the major components of a wireless transceiver station for communicating with one or more mobile wireless devices, according to the preferred embodiment.

FIG. 2 is a high-level block diagram of the major components of a wireless transceiver station 102 for communicating with one or more mobile wireless devices, according to the preferred embodiment. Wireless transceiver station 102 includes a programmable processor 201 which executes a control program 211 resident in internal random access memory 202 to generally control the operation of the station. Station 102 further includes a network interface 203 for communicating with network 101, a wireless transceiver interface 204 for adapting a wireless transceiver, and a wireless transceiver 205 which receives and transmits wireless communications according to a pre-defined protocol, all of which are under the control of processor 201. One or more communications buses 206 support communication among the various electronic components. Bus 206 is represented for clarity in FIG. 2 as a single entity, although it may in fact be multiple buses, bus interfaces, and associated components.

Memory 202 contains a control program 211 comprising a plurality of processor-executable instructions which, when executed on processor 201, control the operation of the wireless transceiver station. Memory 202 preferably includes at least a portion which is protected from data loss in the event of a power loss in the station. Depending on the design, memory may be of a type which is physically non-volatile (e.g., a read-only memory (ROM) or a flash memory), or may be protected from data loss by a back-up battery or other means. Control program 211 is preferably stored in this portion of memory. Alternatively, wireless transceiver station 102 may include a separate non-volatile storage device (not shown), such a rotating magnetic disk drive storage device, on which the control program and other essential data is stored and from which it is loaded into memory 202 as required.

Memory 202 further includes a portion for storing temporary state data 221 and for buffering received data for transmission in one or more buffers 222, 223 (of which two are shown for illustrative purposes, it being understood that the actual number may vary), which may be protected or may be unprotected (volatile) memory. Temporary state data preferably includes a list of neighbors 224, identifying all neighboring wireless stations within communication range of the subject wireless station, and a table of active connections (Connect_Table) 225, identifying all currently active connections. Connect_Table 225 is explained in greater detail herein.

Control program 211 performs all the conventional functions typically required to control the operation of a wireless transceiver station of the type for which it is intended. Control program causes the various station components to communicate with mobile wireless devices to establish connections, maintain state data for the connections, buffer received data (either from the network or from the mobile device) and re-transmit buffered data to the network or mobile device. Control program may also include any of various auxiliary functions, such as diagnostics and error recovery, collection and reporting of usage data, and so forth. In addition to these conventional features, control program 211 includes a set of functions for maintaining wireless connections in the event the mobile device moves out of (or into) the range of its wireless transceiver station. These functions include a neighbor discovery function 212, a virtual MAC generator 213, a connection passing function 214, and a connection receiving function 215, the operation of which are described in greater detail herein.

While a certain number of programs, functions and other entities are shown in memory 202, it will be understood that these are shown for purposes of illustration only, and that the actual number and type of such entities may vary. Further, it will be understood that other software and hardware components of station 102, not necessary to an understanding of the present invention, may be present. Additionally, while the software components of FIG. 2 are shown conceptually as residing in memory 202, it will be understood that some of these components may also be stored elsewhere, e.g. on storage (not shown), and loaded into memory 202 as required. Furthermore, it will be understood that the conceptual representation of FIG. 2 is not meant to imply any particular memory organizational model, and that station 102 might employ a single address space virtual memory, or might employ multiple virtual address spaces which overlap.

Although wireless transceiver station 102 is described and illustrated herein as a special-purpose digital device which functions primarily or exclusively as a conduit for wireless communications, a wireless transceiver station could alternatively be embodied as a general purpose digital computer system having suitable programming to provide the functions described herein and having suitable hardware communications interfaces.

Figure 3:
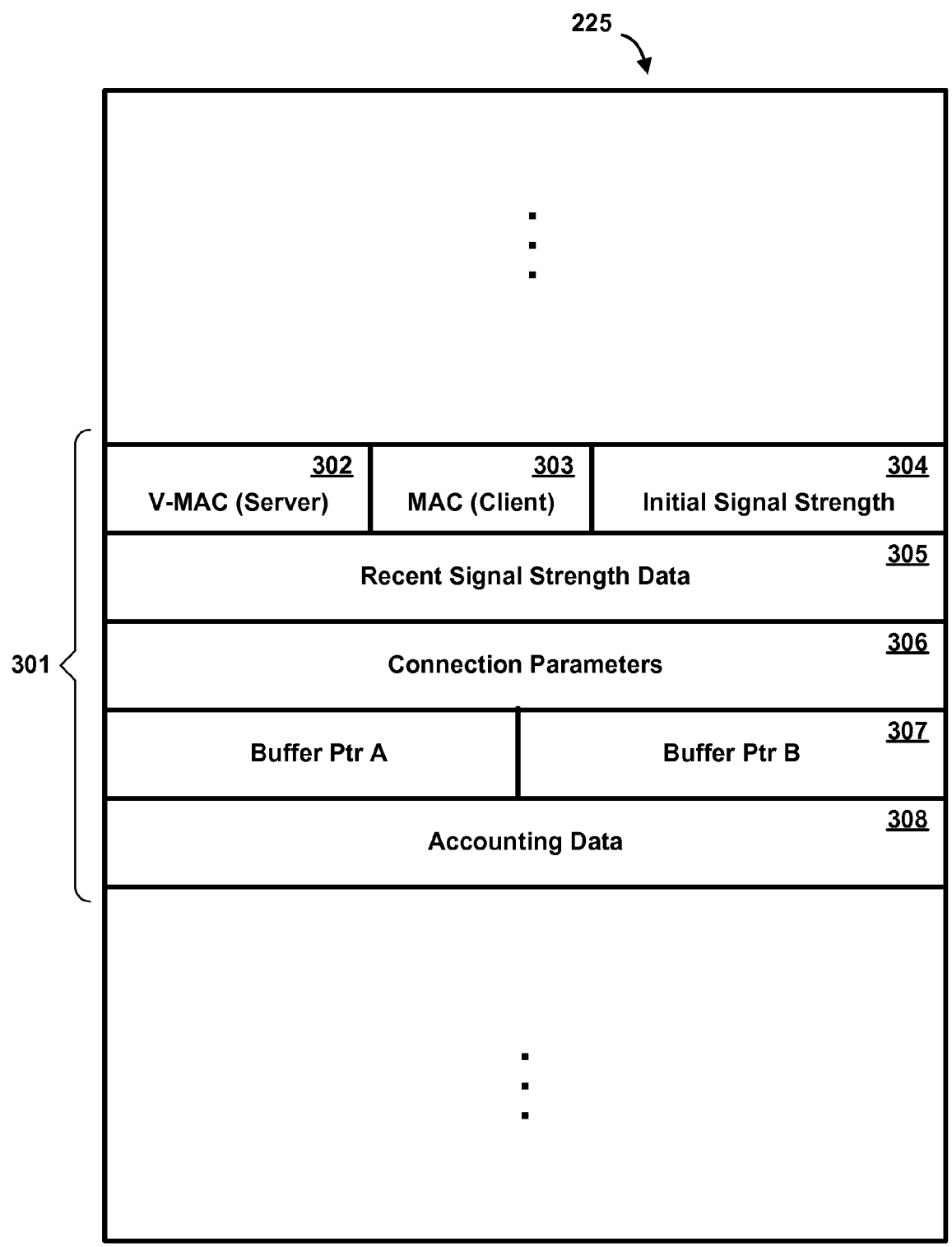
FIG. 3 is a conceptual illustration showing in greater detail a connection data structure for maintaining connection state data, according to the preferred embodiment.

FIG. 3 is a conceptual illustration showing in greater detail Connect_Table 225, according to the preferred embodiment. Connect_Table 225 contains a variable number of entries 301, each entry corresponding to a respective active connection with a single mobile wireless device, which is currently being serviced by wireless transceiver station 102 acting as a server. Entries in Connect_Table 225 are created and removed as connections to particular wireless devices are created and dropped. Each entry contains various state data required to maintain and service the connection. In particular, in the preferred embodiment each entry contains an identifier 302 of server station 102 which is associated with the connection, and an identifier 303 of the mobile wireless device (client). In the preferred embodiment, identifier 302 is a virtual Media Access Control (MAC) address currently associated with station 102 for maintaining the connection, although other identifiers could be used. Identifier 303 is an actual MAC address permanently assigned to the mobile wireless device. A MAC address is a unique hardware number assigned to a device at the time of manufacture, and is used by certain LAN protocols at a low level to uniquely specify a device. A virtual MAC address is data which emulates an actual MAC address in form and function, but is not permanently fixed to a particular device, and is capable of being passed to different devices, as explained more fully herein. The MAC addresses are used for addressing wireless communications from one device to another.

Connect_Table entry 301 further contains an initial signal strength 304 of the connection, i.e. the signal strength of the connection as perceived by wireless transceiver station 102 at the time the connection is established. Connect_Table entry 301 may optionally contain additional signal strength data 305 used to determine recent history and trend of signal strength, such as one or more most recent signal strength measures, a derivative of signal strength with respect to time, etc. Connect_Table entry 301 may further contain various other state data as may be useful in servicing the connection, some or all of which may be optional. For example, Connect_Table may contain connection parameter data 306 used to identify a protocol and variants, transmission speed, or other connection parameters; buffer pointers 307 for identifying data temporarily held in buffers 222, 223 for transmission to network 101 or to the mobile wireless device 103; accounting data 308 such as connection time, cumulative data transferred, and so forth, used for fee-based connection service; and so forth.

Connect_Table 225 is illustrated and described herein conceptually as a table. However, this description is not meant to imply that Connect_Table occupies contiguous addresses in memory, or any particular data structure or organization. Connect_Table may be organized, e.g., as a binary tree, a set-associative table, a linked list, or any appropriate form. It is expected that, unless a very small number of connections is handled at any one time, Connect_Table should be arranged for rapid indexing of an entry according to the MAC addresses associated with the connection, thus permitting a rapid determination whether an incoming communication is intended for station 102.

Figure 4:
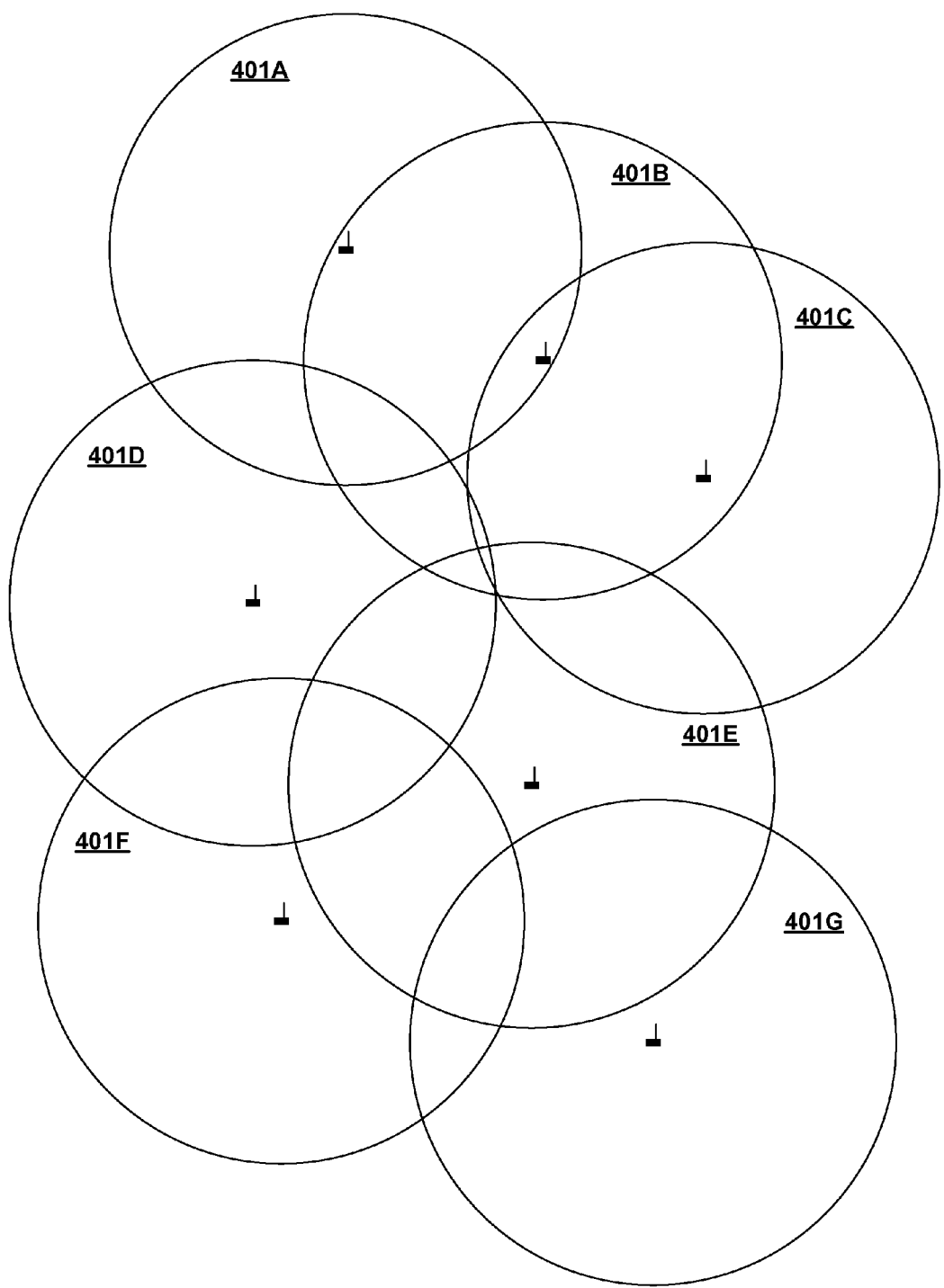
FIG. 4 is a simplified illustration of overlapping transceiver ranges of multiple wireless transceiver stations, according to the preferred embodiment.

As is well known, each wireless transceiver station 102 is capable of communicating with mobile wireless devices within a respective range of the station. Stations are so arranged that the ranges of different transceivers overlap to some degree. FIG. 4 is a simplified illustration of multiple stations and overlapping corresponding transceiver ranges shown as circles 401A-G (herein generically referred to as feature 401). Collectively, transceiver ranges 401A-G provide a coverage area 402 which is the union of all the ranges. Preferably, there is sufficient overlap of ranges to provide coverage to a mobile wireless device located anywhere within a desired area of coverage. Although seven transceiver ranges are illustrated in the example of FIG. 4, it will be understood that the number of wireless transceiver stations in a coverage area may vary, and will often be much larger.

In accordance with the preferred embodiment of the present invention, a mobile wireless device as a client establishes an initial connection with a single wireless transceiver station as a server of a network of transceiver stations, using a protocol such as IEEE 802.11, in which wireless devices exchange data with one another by including a unique identifier (e.g. MAC address) of the destination station in each transmitted packet. The client mobile device thereafter considers the connection made between itself and the device identified by an identifier of the server obtained when the connection is established, i.e. all outgoing wireless transmissions from the client are addressed to this identifier, and incoming transmissions are identified as coming from this identifier. Preferably, the identifier of the server station is a virtual MAC address, which emulates a real MAC address in form and function, but which is not fixed to any particular device. If the client mobile device moves out of range of the wireless transceiver station with which the connection was established, the connection is passed from one wireless transceiver station of the network to another. The new wireless transceiver station server then impersonates the original wireless transceiver station without dropping the connection by assuming its identity to the mobile wireless device. I.e., the new server responds to any transmissions from the client addressed to the identifier (the virtual MAC) established for the original connection, and uses this virtual MAC to communicate with the client. Each server station monitors the signal strength of its connections, and upon determining that any signal is getting weak, attempts to pass the connection to a neighboring server station. This is accomplished by requesting the neighboring server stations to attempt to reach the client, evaluating the signal strength of the various neighbor connections, and choosing a successor server station based on the evaluated signal strength. The successor wireless transceiver station server then impersonates the original wireless transceiver station without dropping the connection by assuming its identity to the mobile wireless device. I.e., the successor server responds to any transmissions from the client addressed to the identifier (the virtual MAC) established for the original connection, and uses this virtual MAC to communicate with the client. The successor wireless transceiver station can pass this virtual MAC on to another successor wireless transceiver station in an indefinite succession of servers as the client moves around the network.

Figure 5:
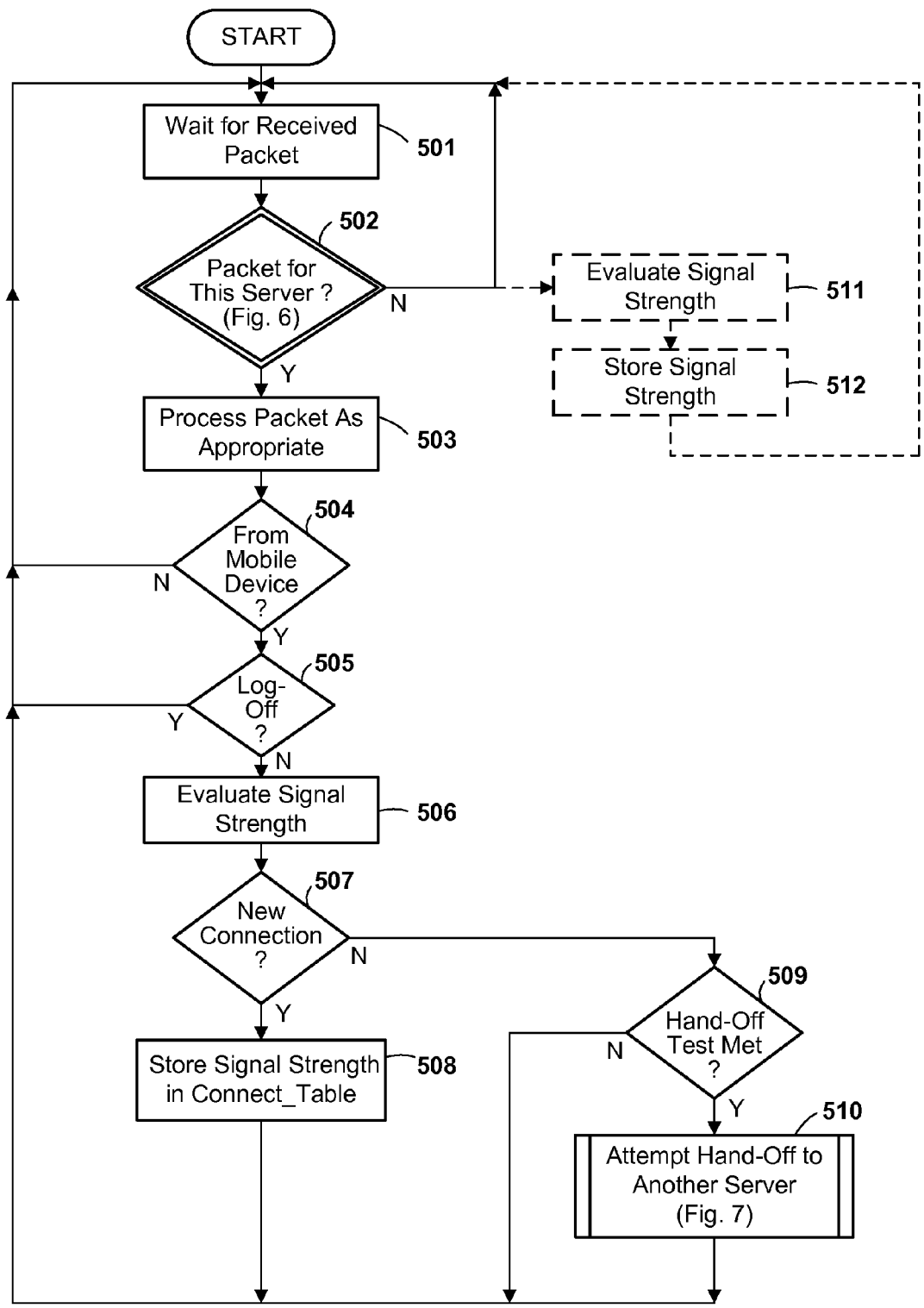
FIG. 5 is a high-level flow diagram of a generalized process of receiving and processing wireless communications in a server wireless transceiver station, according to the preferred embodiment.

FIG. 5 is a high-level flow diagram of a generalized process of receiving and processing wireless communications in a server wireless transceiver station 102, according to the preferred embodiment. Referring to FIG. 5, a process controlling wireless communications is in a wait state at step 501, waiting for wireless transceiver 205 to receive an incoming data packet. Depending on the design and protocol parameters, wireless transceiver 205 may be capable of receiving data at multiple transmission frequencies simultaneously, so that transmissions may overlap, but for clarity of explanation and illustration herein it is assumed that packets arrive serially. Upon receiving a packet, a determination is made whether the received packet is intended for the server receiving (detecting) it. This determination is represented in FIG. 5 as block 502, and is shown in greater detail in FIG. 6.

Figure 6:
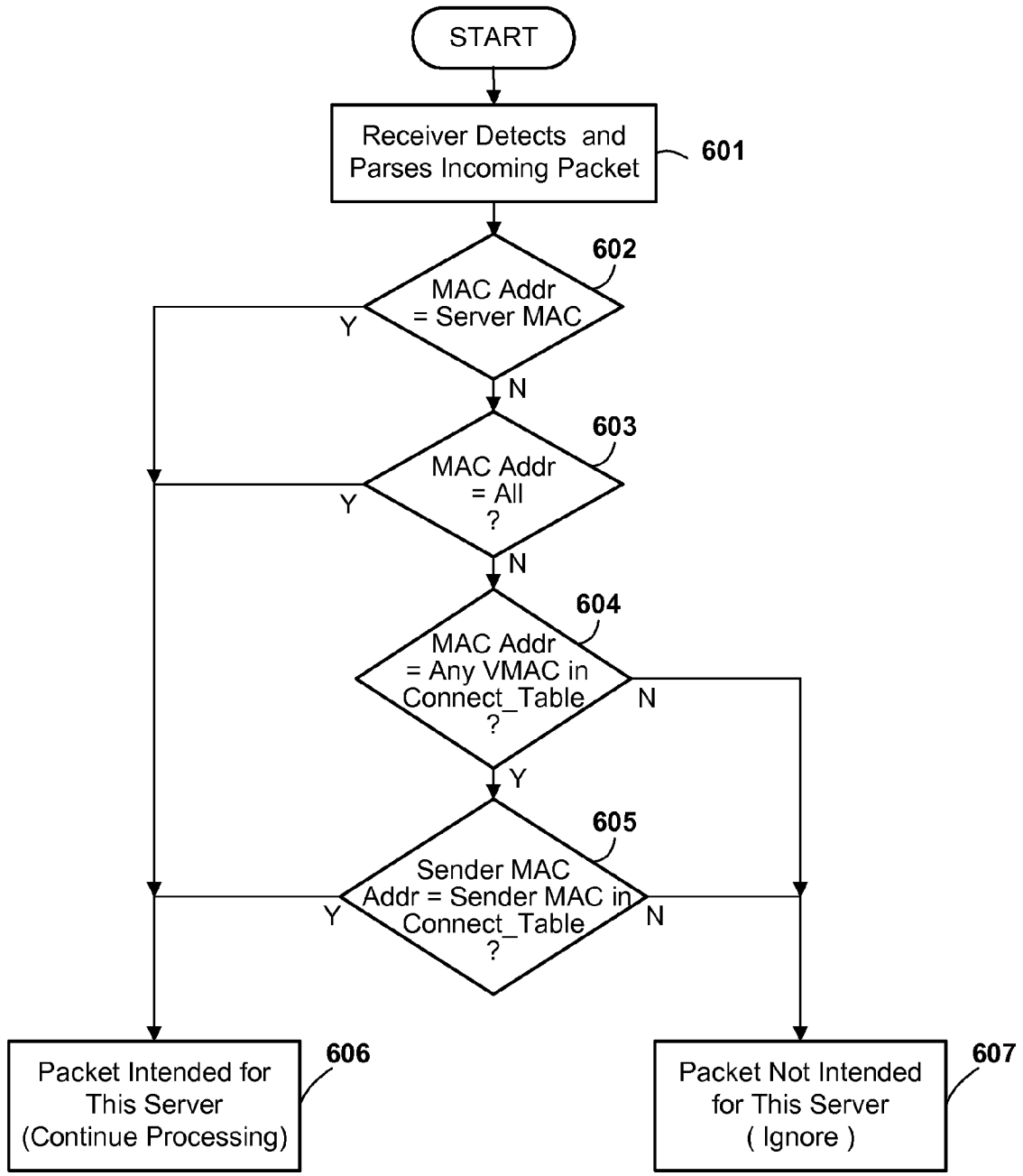
FIG. 6 is a flow diagram illustrating a decision process for determining whether a received wireless transmission is intended for a server station detecting it, according to the preferred embodiment.

Referring to FIG. 6, which is a flow diagram illustrating a decision process for determining whether a received packet is intended for the server, the server station detects a packet being transmitted from another wireless transmitter and parses the incoming packet to extract vital data required for determining a destination (step 601). If the destination identifier (preferably MAC address) in the packet header is the same as the MAC address of the server (i.e., the permanent MAC address fixedly assigned to the server station), then the 'Y' branch is taken from step 602, and the determination made that the packet is intended for this server (step 606). If not, the 'N' branch is taken to step 603. In this case, if the destination identifier (MAC address) in the packet header is a special value, such as null, indicating a broadcast transmission intended for all recipients, then the 'Y' branch is taken from step 603, and the determination made that the packet is intended for this server (step 606).

If the destination MAC address is neither the server station's permanent MAC address nor a special broadcast MAC address value (the 'N' branch from step 603), then the server determines whether the destination MAC address and sender of the packet correspond to those of some active connection in which the sender (client) is using a virtual MAC address to communicate with the server station. The Connect_Table 225 is accessed to determine whether the destination MAC address and sender correspond to those of any active connection listed in the Connect_Table. Preferably, the Connect_Table has an indexing mechanism for determining whether a given MAC address corresponds to the server VMAC 302 of any entry(ies) in the table, although this could alternatively be accomplished by scanning the entries. If the destination MAC address in the packet does not correspond to the server VMAC 302 of any active connection entry in the Connect_Table, the 'N' branch is taken from step 604, and the determination is made that the packet is not intended for this server station, causing the packet to be ignored (step 607). If the destination MAC address corresponds to one or more entries in the table (the 'Y' branch from step 604), then the server determines whether the MAC address of the sender for the packet is identical to the MAC address(es) of the client 303 of each such entry in the table (step 605). Again, there could be an indexing mechanism for determining this, or it could be determined by scanning all the applicable entries. If there is a match, then the 'Y' branch is taken from step 605, and the determination is made that the packet is intended for this server (step 606). If there is no match, the 'N' branch is taken from step 605, and the packet is thereafter ignored (step 607). It will be observed that, in the preferred embodiment, a virtual MAC address is not necessarily unique, and that in order to determine whether the communication is intended for the server station, one should match both the virtual MAC and the MAC address of the mobile client. It would alternatively be possible to generate some form of identifier which is unique to a particular connection, so that only one match is required.

Referring again to FIG. 5, a determination that a packet is not intended for the server station as described above with respect to FIG. 6 causes the 'N' branch to be taken from step 502, and the server returns to step 501 to wait for the next packet. If a determination is made that the packet is intended for this server station, the 'Y' branch is taken from step 502, and the packet is then processed as appropriate (step 503). Since server station 102 generally functions as a conduit for communications using network 101, processing a packet received from a mobile wireless device generally involves re-transmitting the packet to another device coupled to network 101. However, there are certain special exceptions which will be processed in server station 102, without re-transmitting to the network. For example, certain communications associated with maintaining the connection, such as those which are required to establish the initial connection, or signal that the mobile client is logging off, or to "ping" a device to determine whether the connection is still active. Additionally, in the preferred embodiment, wireless transceiver stations are capable of communicating directly with one another for purposes of discovering their immediate neighbor stations and for passing connections from one station to another, as described herein.

If the packet was not received from a mobile wireless device 103 as a client, for which station 102 is acting as a wireless transceiver server, then the 'N' branch is taken from step 504, and the station waits for the next packet. Otherwise, the 'Y' branch is taken, and the server evaluates the signal strength of the transmission received using any conventional or hereafter developed technique to generate a figure of merit representing relative strength of the signal (step 505). If the connection is a new connection (i.e., if the packet received was part of establishing an initial connection, represented as the 'Y' branch from step 506), then the evaluated signal strength value is stored in the initial signal strength field 304 of the applicable Connect_Table entry (step 507).

If the connection is not a new connection, but is a log-off communication, then the 'Y' branch is taken from step 508, and the corresponding connection entry 301 is removed from Connect_Table 225 (step 512). The connection must then be re-established in order to communicate again with the server station.

If the connection is not new and the packet is not a log-off, i.e., the packet is one in the middle of a communication session, the 'N' branch is taken from step 508. In this case, the server station makes a determination whether to attempt passing, or "handing off", the connection to another server station (step 509). The determination whether to hand off a connection involves the current signal strength evaluated at step 505, and may be simple or complex. In a simple embodiment, the current signal strength value is compared to a single threshold, which is the minimum of a pre-determined fixed threshold and the evaluated signal strength when the connection was initially made, which is stored in initial signal strength field 304. The pre-determined fixed threshold is based on the known typical characteristics of mobile devices, locations of server stations, and so forth, and is intended to prevent unnecessary hand-off attempts while signal strength is good, while triggering such hand-off attempts when signal strength becomes marginal, but before it is lost altogether. The reason for using the minimum of the pre-determined threshold and the initial signal strength is that the mobile client chose the connection initially based on this signal strength, so presumably it was the best available. A more complex determination may involve taking into account any of various other factors. For example, if a hand-off of the connection was recently attempted and failed, one may wish to prevent another attempt during a delay period. The length of the delay period could be fixed, or could vary depending on observed rate of change in the signal strength over multiple past samples. The threshold might also be variable depending on observed rate of change in signal strength (indicating how fast the mobile client is moving). The threshold might also be variable depending on how busy the station is, e.g., a lower threshold for handing off a connection can be used if the station is very busy, thus equalizing to some degree the burden of servicing high-traffic clients.

If a determination is made not to attempt hand-off, the 'N' branch is taken from step 509, and the server returns to wait for the next packet. Otherwise, the server will attempt to hand-off the connection to a neighbor server station. This hand-off process as performed by connection passing function 215 is represented in FIG. 5 as step 510, and is shown in greater detail in FIG. 7. Whether the hand-off is successful or not, the server then returns to step 501 to wait for the next packet.

Figure 7:
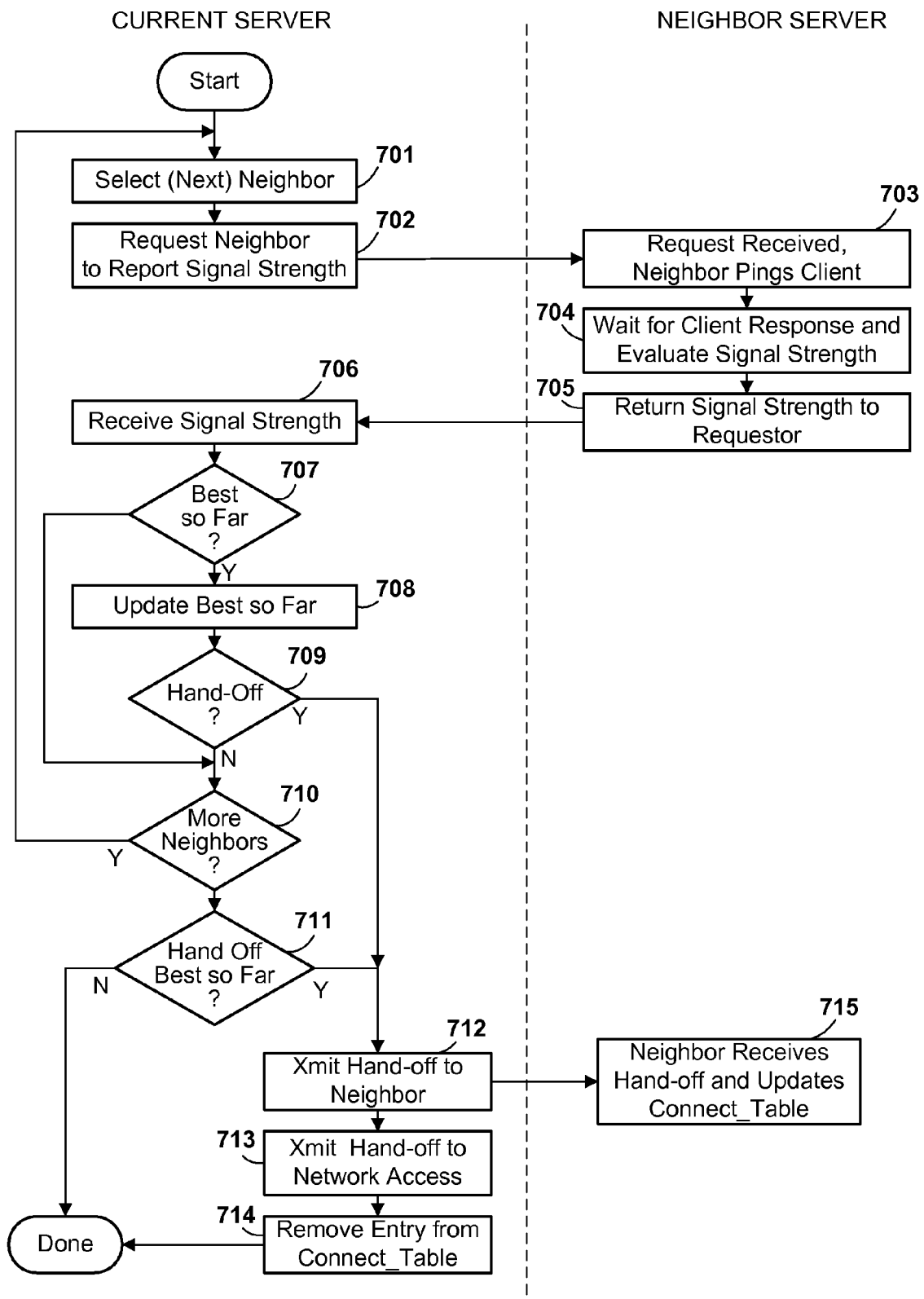
FIG. 7 is a flow diagram illustrating a process of passing or "handing off" an active connection with a wireless device from one wireless transceiver station to a neighboring wireless transceiver station, according to the preferred embodiment.

Referring to FIG. 7, a hand-off attempt begins by selecting a neighbor server station from the list of neighbors 224 (step 701). Selection can be random, but in one embodiment, signal strength data 305 in the connection table entry 301 includes most recent signal strength reported by the various neighbors in a previous hand-off attempt. In this embodiment, the neighbors are selected in order of most recent signal strength, to increase the probability of finding a suitable hand-off immediately. The server station then sends a request addressed to the neighbor (i.e., the neighbor's fixed MAC address), requesting that the neighbor report the signal strength between the neighbor and the client (step 702). This request includes the MAC address of the client, as well as the virtual MAC address being used by the current server to service the connection.

The neighbor server receives the request and pings the client mobile device (step 703). "Pinging" the client means sending a brief message to the client, requesting a response. When the neighbor server pings the client, it identifies itself using the virtual MAC address which is used by the current server to service the connection, effectively impersonating the current server. To the client, the ping request appears to come from the current server. The neighbor may temporarily place an entry in its Connect_Table so that the ping response will be recognized as intended for it, or may use some other mechanism for recognizing the ping response.

If the client is within range of the neighbor and receives the ping, it responds by transmitting a ping response addressed to the virtual MAC address used by the current server. The neighbor server waits for this response, and if a response is received within an expected time period, evaluates the signal strength of the response (step 704). If no response is received within the expected time period, the neighbor concludes that the mobile client is out of range, and evaluates the signal strength as zero. In either case, the neighbor responds to the requesting current server, reporting the signal strength of the transmission from the mobile client (step 705).

In an alternative embodiment, each wireless station continually monitors the signal strengths of mobile wireless devices within its range of communication. In response to a request for signal strength transmitted at step 702, the neighbor station simply reports signal strength based on recent monitoring data, and thus it is unnecessary to ping the mobile client as above described to determine the signal strength. This alternative embodiment is illustrated in FIG. 5 as steps 511-512. As shown in FIG. 5, when a station receives a communication from a wireless client and determines that the communication is not intended for itself (the 'N' branch from step 502), it nevertheless evaluates the signal strength of the received communication (step 511), and stores this evaluated signal strength in an appropriate data structure (not shown) which associates recent signal strengths of communications with mobile wireless devices (step 512). Preferably, this signal strength data is aged so that the neighbor does not report obsolete signal strength data. Upon receiving a request for signal strength, the neighbor consults the appropriate data structure to find the strength of the most recent communication with the mobile client, and reports signal strength based on the information in the data structure. This alternative embodiment has the advantage of reducing pinging activity and further of reducing the time required to respond to the request for signal strength data. However, it requires that each station evaluate and maintain signal strength data for any device within its range, whether or not the station is connected to the device, and so may impose additional processing burden. Additionally, it would not necessarily be appropriate if evaluating signal strength requires an exchange of communications between the station and the mobile wireless device.

The current server receives the response from the neighbor reporting signal strength (step 706). If the reported signal strength is the strongest signal received so far in the hand-off attempt, then the 'Y branch is taken from step 707; the strongest signal received so far is updated (step 708); and a determination is made whether to hand off the connection to the neighbor server which just reported (step 709). If, at step 707, the signal received is not the strongest so far, then steps 708 and 709 are by-passed.

Step 709 represents a determination whether to abort further ping requests to the various neighbors and select the neighbor which just responded. Preferably, this determination amounts to comparing the signal strength of the neighbor which just reported to a fixed, pre-determined threshold, although the determination could involve greater complexity. Although it is theoretically possible that some other neighbor not yet polled will have better signal strength, step 709 reduces the amount of pinging, where a reasonably good signal has been found. In an alternative embodiment, step 709 is skipped entirely, and the decision whether to hand off the connection is not made until all neighbors report. If the determination is made to abort further pinging, the 'Y' branch is taken from step 709 to step 712; otherwise, the process continues to step 710

If, at step 710, there are more neighbors on the list, the 'Y' branch is taken to step 701, and a next neighbor is selected for pinging the client. When all neighbors have pinged the client and reported results, the 'N' branch is taken from step 710.

Having polled all neighbors (the 'N' branch from step 710), the current server determines whether to hand off the connection to the neighbor reporting the strongest signal (step 711). This determination could amount to a simple comparison of the signal strength reported by the neighbor having the strongest signal, with the signal strength most recently evaluated in the current server, choosing whichever station has the stronger signal. However, in the preferred embodiment, the determination would slightly favor the current server by multiplying the current server signal strength by a fixed coefficient greater than one, e.g. by 1.25, and comparing the product to the unadjusted signal strength of the neighbor. The reason for this adjustment is that it reduces oscillating hand-offs of the connection where a mobile client is about equidistant between two server stations. It would alternatively be possible to introduce other factors into the determination.

If the determination made at step 711 is not to hand off the connection, the 'N' branch is taken, and the connection passing function 214 returns with an unsuccessful result, meaning that the current server will continue to handle the connection. If the determination is made to hand off the connection, the 'Y' branch is taken from step 711, and the current server transmits a connection passing request to the chosen neighbor (step 712). The connection passing request contains any necessary information from the Connect_Table entry 301 for the connection, and in particular contains the virtual MAC address being used to service the connection and the MAC address of the mobile client.

The current server also transmits an appropriate message to hand off the connection to the network access device 104 (step 713). In the preferred embodiment, network access device 104 maintains a state table of all active connections from wireless devices to the network, this state table including an identifier (such as the fixed MAC address) of the currently active wireless transceiver station for accessing the mobile wireless device. On receipt of such a message, network access device changes the identifier of the wireless transceiver station to that of the neighbor station to which the connection is being transferred. Thereafter, if any packets are received from the network in network access device 104 and destined for the mobile wireless device 103 which is the subject of the connection, these are routed to the neighbor station instead of the current station. Where wireless transceiver stations 102 are not coupled to a common network access device 104, alternative means could be used for routing incoming communications from the network to the mobile wireless device. For example, the current wireless transceiver station could forward the packet to the neighbor station for transmission to the mobile device, either via wireless link or via wired network connections. Alternatively, a forwarding mechanism could exist at some higher level of the network for changing the routing of a packet.

Having handed off the connection to a neighbor and transmitted a hand-off message to the network access device as described above with respect to steps 712 and 713, the current server then removes the corresponding connection entry 301 from its Connect_Table (step 714). The current server will thereafter ignore any wireless transmissions it receives from the mobile wireless device, unless the connection is passed back to it in the same manner. The connection passing function then returns, having successfully passed the connection.

When the neighbor server receives the connection passing request sent by the current server at step 712, it generates a corresponding entry in its Connect_Table, copying the virtual MAC address previously used by the current server and the MAC address of the mobile client (step 715). The neighbor thereafter assumes the identity of the original server to the client, by responding to any wireless transmissions from that particular client addressed to that particular virtual MAC address.

Figure 8:
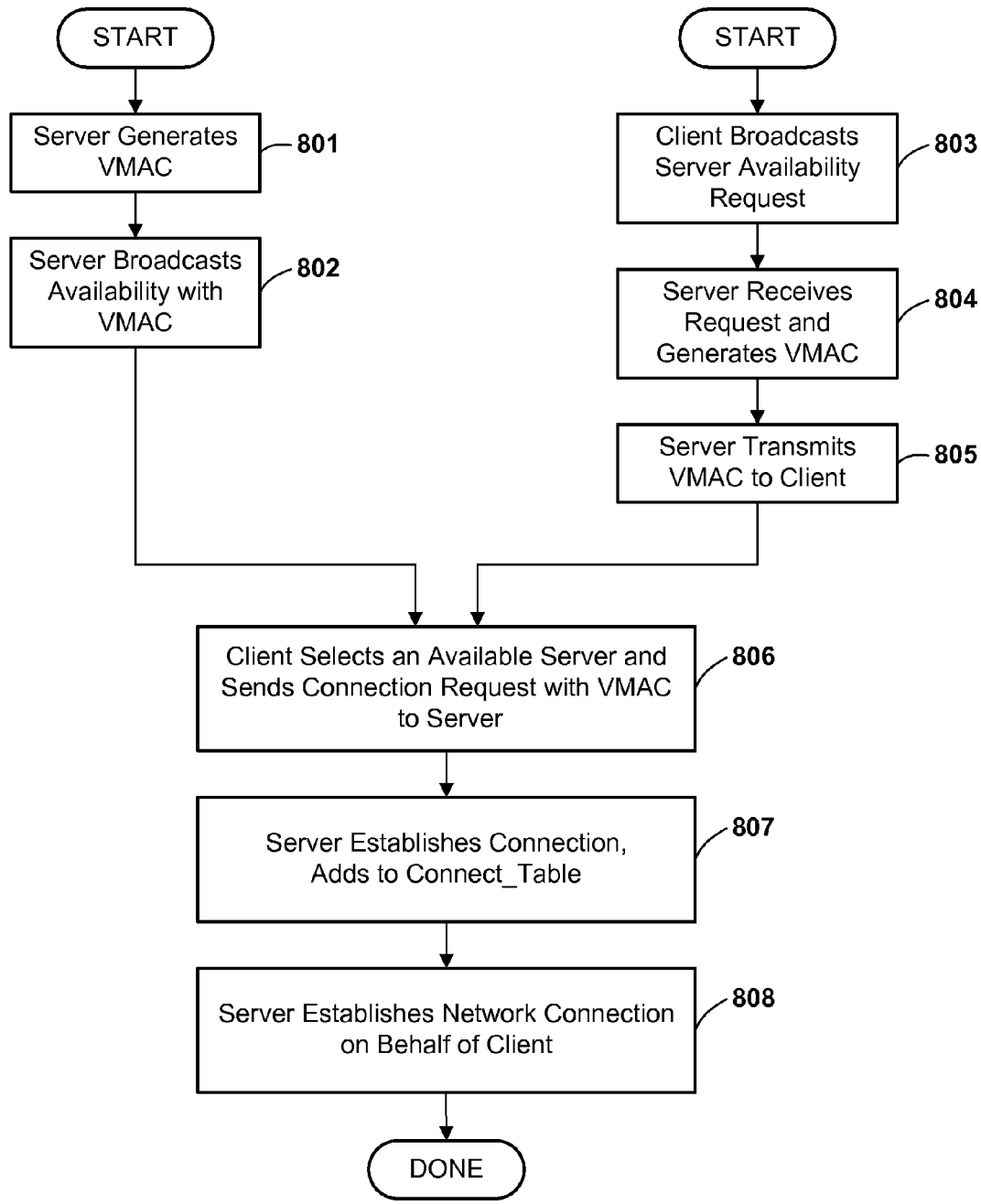
FIG. 8 is a flow diagram illustrating a process of initially establishing a connection between a mobile wireless device and a network using a wireless transceiver station, according to the preferred embodiment.

FIG. 8 shows the process of initially establishing a connection between a mobile wireless device and network 101 using a wireless transceiver station. Depending on the applicable protocol, this may be accomplished in either a server-initiated broadcast or a client-initiated broadcast. In a server-initiated broadcast, illustrated as the left branch, a server station generates a virtual MAC address for itself (step 801), and periodically broadcasts its availability to service mobile client devices, the availability broadcast including the virtual MAC address of the server (step 802). In a client initiated broadcast, a mobile wireless client broadcasts a request for service to any server in listening range, this broadcast including the fixed MAC address of the mobile client (step 803). Any server receiving the broadcast responds by generating a virtual MAC address to identify itself to the client (step 804), and transmitting an availability message to the mobile client, the availability message being addressed to the mobile client (step 805).

The mobile client may receive multiple server availability broadcasts (step 802) or availability messages (step 805) from multiple respective servers. The client selects one of these servers to service the connection, and sends a connection request to the server, addressed to the chosen server's virtual MAC address (step 806). The server responds by establishing the connection, which, among other things, includes updating the Connect_Table to include an entry corresponding to the connection (step 807). The server further establishes a connection with network 101 by generating a connection request to network access device 104 on behalf of the client (step 808).

Whether generated at step 801 or step 804, a virtual MAC address is an identifier which is formatted like any other MAC address, and to the client appears to be the MAC address of its server station. It is not the server station's fixed MAC address, which is still used in certain communications (e.g. between server stations, or between network access device 104 and a server station). Preferably, the virtual MAC address is locally unique when the client is attempting to make the connection, i.e., if multiple servers provide respective virtual MAC addresses to the client, there should be no duplicates among these. It is not necessary that uniqueness be assured to a mathematical certainty; rather it is merely desirable to avoid duplication since, at the very least, some action will be required to resolve the presence of duplicate addresses. There are several possible ways in which VMACs may be provided. In one simple embodiment, each server station has a respective fixed MAC address and a single virtual MAC address assigned to it, these being unique. The server always uses the same VMAC to establish a connection, although once the connection is established, it can be passed on to other servers. In an alternative embodiment, the server generates a virtual MAC address randomly from a pool of virtual MAC addresses which is shared by all the servers, the pool being sufficiently large to make duplication unlikely.

Certain communications from the client during the initial connection process should be recognized by even though the connection is not yet established. This may be accomplished in any of various ways. For example, if the client initiates connection by broadcasting the availability request, shown as the branch starting with step 803, the server could place a temporary entry in the Connect_Table when it responds at step 805, the temporary entry including the client MAC and server VMAC. The server will then recognize the connection request sent by the client at step 806. Alternatively, an additional test might be included in the procedure of FIG. 6 to recognized client connection requests. E.g., if an incoming packet is a packet requesting a connection, and it is addressed to a VMAC generated by the server, then it would be recognized as a packet intended for this server, even if an entry is not in the Connect_Table.

Figure 9:
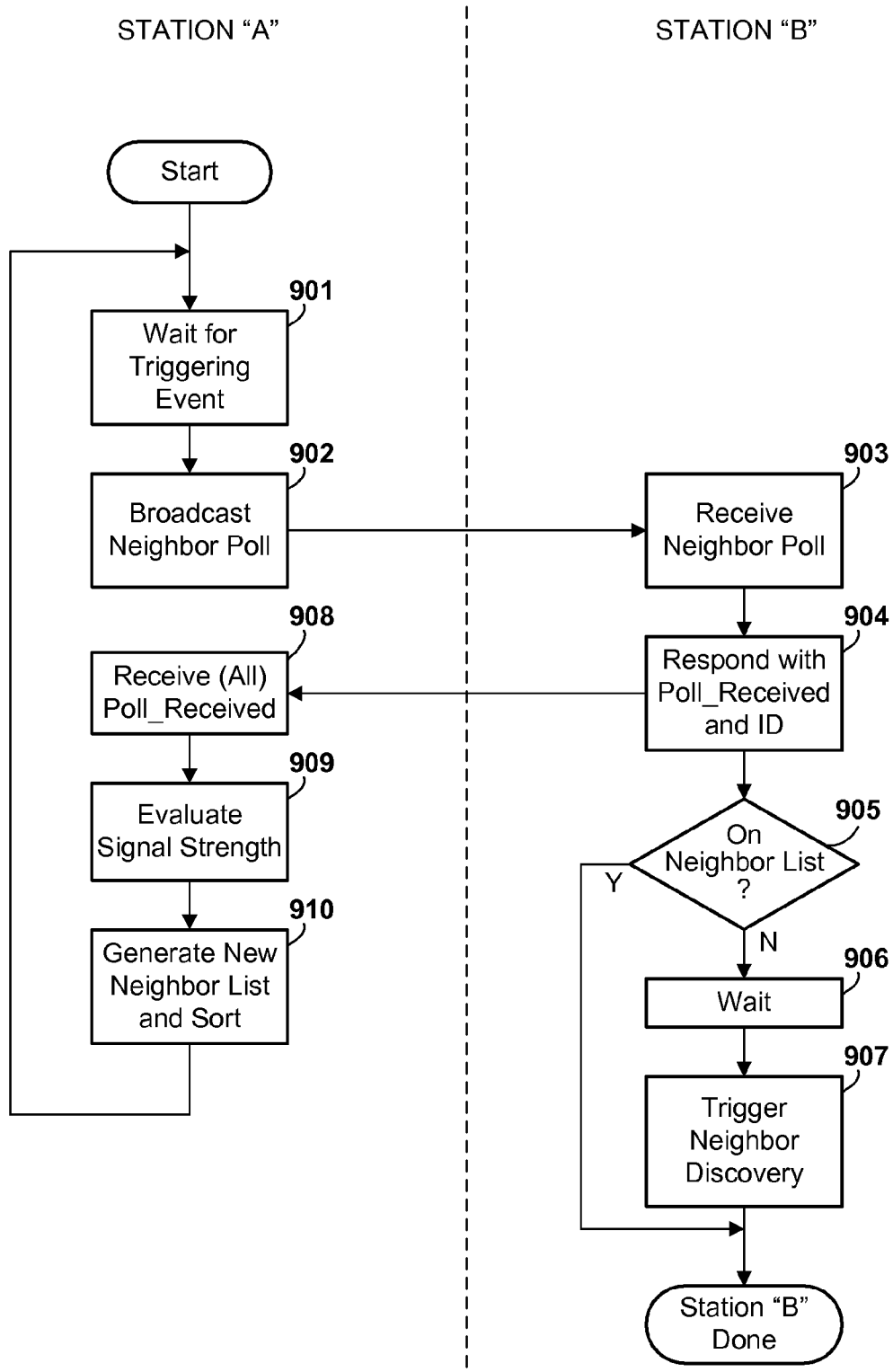
FIG. 9 is a flow diagram illustrating the peer-to-peer neighbor transceiver station discovery process, according to the preferred embodiment.

In the preferred embodiment, each wireless transceiver station automatically discovers the identity of its immediate neighbor stations by a peer-to-peer polling process performed by neighbor discovery function 212. FIG. 9 is a flow diagram illustrating the peer-to-peer neighbor station discovery process.

Referring to FIG. 9, various steps performed in a wireless transceiver station attempting to discover its neighbors (herein designated station "A" for clarity) are shown on the left side of the figure, while steps performed by a neighbor station which is discovered (herein designated station "B" for clarity) are shown on the right side of the figure. In the preferred embodiment, a neighbor discovery sequence is invoked from time to time within a station (station A) to determine a set of active wireless transceiver stations which are physically close enough to communicate with.

At step 901, the neighbor discovery process is idle, waiting for a triggering event. A triggering event could be a passage of time, i.e., the discovery process is performed on a periodic basis. Since the purpose is typically to discover the locations of relatively static transceiver stations, the discovery process need not be triggered often. For example, once an hour, or even once a day or longer, might be sufficiently frequent. On the other hand, if the transceiver stations themselves are mobile, it will typically be necessary to trigger a discovery process with much greater frequency. A triggering event might also or alternatively be based on some known change to the configuration of transceiver stations. For example, if it is known that there has been a power outage or some other event which could affect the configuration, such an event may trigger a neighbor discovery process.

When the neighbor discovery process is triggered by the triggering event, the transceiver station attempting to discover its neighbors (station "A") broadcasts a neighbor_polling_request on its wireless transmitter (step 902). This broadcast will be received by any station "B" within communication range, i.e., the neighbor stations. The neighbor_polling_request is not addressed to any specific station; it uses some special destination station identifier or other protocol device to indicate that it is a broadcast, i.e, intended for all recipients. The neighbor_polling_request contains an identifier of the transmitting station "A". Preferably, the identifier is the actual, fixed MAC address of transmitting station "A" (i.e., not a virtual MAC address), although other identifiers could be used.

As shown in the right column of FIG. 9, a neighbor station "B" within communication range receives the broadcast neighbor_polling_request (step 903). Station "B" responds to the neighbor_polling_request by transmitting a neighbor_poll_received message (step 904), the neighbor_poll_received message being addressed to station "A", and containing an identifier (preferably the MAC address) of the neighbor station which transmits it, i.e. station "B".

Station "B" then checks its own list of neighbors 224 to determine whether station "A" is on its list of neighbors (step 905). If not, the list is apparently obsolete, and, after a brief wait interval (Step 906), a neighbor discovery process is triggered in station "B" to update station "B'"s neighbor list. (step 907). Station "B" waits briefly before triggering the neighbor discovery process to allow station "A" to complete its original neighbor discovery process. It is preferred that the neighbor discovery process be triggered rather than simply add station "A" to the neighbor list of station "B". One reason for this is that it can not be certain that the two stations can communicate with each other. The fact that station "B" can receive a transmission from station "A" does not necessarily mean that the reverse is true. By triggering the neighbor discovery process in station "B", station "B'"s neighbor list will be updated to include station "A" only if it can be verified that 2-way communication is possible. It will be noted that, in this manner, if a new station is added to the wireless network and performs a neighbor discovery process, a corresponding neighbor discovery process will be triggered in each of its neighbors, thus automatically updating the neighbor lists of all neighbor stations.

Although represented only once in FIG. 9 for clarity of illustration, it will be understood that steps 903-907 will be repeated by each neighbor station which receives the broadcast neighbor polling request from station "A". Because multiple stations may be attempting to transmit respective neighbor_poll_received messages to station "A" simultaneously, any conflict resolution protocol or technique, now known or hereafter developed, may be used as required.

Station "A" receives each neighbor_poll_received message which is transmitted from a neighbor station (step 908). There may be multiple such neighbor_poll_received messages. For each neighbor_poll_received message which is received in station "A", station "A" will attempt to judge the signal strength of the received communication, and assign a figure of merit to the signal strength using any known or hereafter developed technique (step 909). When sufficient time has elapsed to have received all responses to the neighbor poll, station "A" generates a new neighbor list 224, containing entries corresponding to the stations from which a response was received to the neighbor poll (step 910). Each entry in the neighbor list 224 preferably includes an identifier (such as the MAC ID) of the neighbor station and the figure of merit assigned to the signal strength of the neighbor station. The neighbor list is preferably sorted in order of signal strength. The neighbor discovery process in station "A" is then complete, and the neighbor discovery process returns to an idle state at step 901 to await the next triggering event.

In the preferred embodiment, each wireless transceiver station is capable of communicating with its immediate neighbor stations by wireless communications. In the example of FIG. 4, it will be observed that most of the stations lie outside the transceiver ranges of their closest neighbors. The ranges illustrated in FIG. 4 are the ranges for communicating with mobile wireless devices. Typically, it is expected that mobile wireless devices will transmit at a lower power than the transceiver within a wireless transceiver station, and/or may be located in local areas of poor reception, so that range for communicating with a mobile wireless device is more limited. If transceiver stations are communicating directly with one another, the expected communications range is typically greater. In the example of FIG. 4, it is preferred that each transceiver station be able to communicate directly by wireless communication with any neighbor station having a transceiver range 401 which overlaps its own. Thus, it is preferred that the transceiver station having range 401E be able to communicate directly with the stations having ranges 401B, 401C, 401D, 401F and 401G, even though none of these stations is located within transceiver range 401E. Although a preferred embodiment, this is not a requirement. If direct station-to-station communication does not have a significantly greater range than station-to-mobile device communication, it would alternatively be possible to physically arrange transceiver stations closer together, having greater overlapping ranges. As another alternative, it would be possible to support station-to-station communications using network 101, or using a separate network. Finally, it would be possible to manage multiple transceiver stations using a separate device acting as a controller, such as network access device 104, so that peer-to-peer communications among transceiver stations are not employed.

In the preferred embodiment, an alternative transceiver station is determined by requesting each neighbor to report signal strength with the mobile wireless device (either by pinging the mobile wireless device, or by monitoring signal strength when not connected), and comparing signal strength of responses received from the neighbor stations and the current signal strength. This method has the advantage that it can easily be implemented with typical conventional hardware, and does not require knowledge of the location of the mobile device. However, a suitable successor transceiver station could be determined by other means. For example, if the transceiver stations are capable of determining relative direction of the mobile device, they could estimate its location and therefore determine an appropriate neighbor, without neighbor polling. Similarly, if the mobile device is equipped with global positioning capability, the transceiver station could ask the mobile device for its current global position, and determine an appropriate neighbor accordingly. Other alternatives may be possible.

It will be understood that the exchange of information is described herein in a simplified manner for clarity of description and illustration, and that certain additional steps, such as acknowledgments, combining of multiple packets in a train, and so forth, may be required or employed in accordance with an applicable protocol.

It will be understood that disclosed herein is a preferred embodiment of a technique for automatically maintaining a connection with a mobile wireless device, and that many variations in addition to those specifically discussed herein are possible in the method steps shown in FIGS. 5-9 and described above. Specifically, it will be recognized that the order of performing certain steps may be changed, that some steps may be optional or may be performed in a different manner from that described herein, that some steps may be combined, and so forth.

In the preferred embodiment, the IEEE 802.11 protocol is used for wireless communication among mobile digital devices. However, the present invention is not necessarily limited to this particular protocol, and is generally applicable to any wireless protocol which requires that connections be established between particular devices identified by corresponding identifiers. The invention could be used for wireless communications with a wide variety of mobile wireless devices, including cell phones, although certain existing protocols (particularly cell phone protocols) provide alternative means for maintaining a connection when the mobile device moves out of range of a wireless transceiver station. The present invention has the advantage of requiring no alteration of existing mobile wireless devices, since a successor transceiver station acting as a server impersonates the original station, and the client need not know that it is now communicating with a different station.

In general, the routines executed to implement the illustrated embodiments of the invention, whether implemented as part of an operating system or a specific application, program, object, module or sequence of instructions are referred to herein as "computer programs". The computer programs typically comprise instructions which, when read and executed by one or more processors in the devices or systems in a computer system or other digital data device consistent with the invention, cause those devices or systems to perform the steps necessary to execute steps or generate elements embodying the various aspects of the present invention. Moreover, while the invention has and hereinafter will be described in the context of fully functioning computer systems or other digital data devices, the various embodiments of the invention are capable of being distributed as a program product embodied in a computer-readable media in any of a variety of forms, and the invention applies equally regardless of the particular type of media used. Furthermore, an a program may be distributed or downloaded to or from computer-readable media using any of various transmission technologies. Examples of computer-readable media include, but are not limited to, volatile and non-volatile memory devices, floppy disks, hard-disk drives, CD-ROM's, DVD's, magnetic tape, and so forth. An example of computer-readable media is illustrated in FIG. 2 as memory 202.

Although a specific embodiment of the invention has been disclosed along with certain alternatives, it will be recognized by those skilled in the art that additional variations in form and detail may be made within the scope of the claims which follow the Appendices herein.

What is claimed is:

1. A method of servicing a mobile wireless device, comprising the steps of:

establishing a connection between a mobile wireless device and a first wireless transceiver station according to a wireless communications protocol, said connection for providing a communications service to said mobile wireless device;

automatically determining that a second wireless transceiver station has a better wireless signal for communicating with said mobile wireless device than said first wireless transceiver station has for communicating with said mobile wireless device;

responsive to said automatically determining step, automatically passing said connection from said first wireless transceiver station to said second wireless transceiver station, said second wireless transceiver station thereafter impersonating said first wireless transceiver station to provide said communications service to said mobile wireless device via said connection.

2. The method of claim 1, wherein said wireless communications protocol is a packet-based protocol.

3. The method of claim 1, wherein said step of automatically determining that a second wireless transceiver station has a better wireless signal for communicating with said mobile wireless device than said first wireless transceiver station has comprises the steps of:

automatically determining a respective signal strength for communicating with said mobile wireless device at each of a plurality of neighbor stations; and automatically comparing the respective signal strengths determined by said determining step with a current signal strength for communicating with said mobile wireless device of said first wireless transceiver station.

4. The method of claim 3, wherein said step of automatically determining a respective signal strength at each of a plurality of neighbor stations comprises the steps of:

requesting each of said plurality of neighbor stations to attempt to communicate with said mobile wireless device, evaluate a respective signal strength of the communication, and report the respective signal strength to said first wireless transceiver station.

5. The method of claim 1, further comprising the step of:
automatically determining the identities of a plurality of neighbor wireless transceiver stations by broadcasting a poll by wireless transmission from said first wireless transceiver station, and receiving a respective poll response from each of said plurality of neighbor wireless transceiver stations.

6. The method of claim 1, wherein said communications service comprises access to the Internet.

7. The method of claim 1, wherein each wireless communication according to said wireless communications protocol contains a destination identifier identifying a device for which the communication is intended.

8. The method of claim 7,
wherein said destination identifier comprises a Media Access Control (MAC) address;
wherein said step of establishing a connection comprises providing a virtual MAC address to said mobile wireless device, said first wireless transceiver station responding to communications from said mobile wireless device addressed to said virtual MAC address; and
wherein said step of automatically passing said connection from said first wireless transceiver station to said second wireless transceiver station comprises providing said virtual MAC address to said second wireless transceiver station, said second wireless transceiver station thereafter responding to communications from said mobile wireless device addressed to said virtual MAC address to impersonate said first wireless transceiver station.

9. A first wireless transceiver station for servicing mobile wireless devices, comprising:
a wireless transceiver for communicating with mobile wireless devices using a wireless communications protocol, wherein according to said wireless communications protocol, a wireless communications connection is established between two devices by providing device identifiers of the two devices, wireless communications thereafter including a device identifier of a destination device; and
a control function which automatically monitors each of a plurality of active connections with respective mobile wireless devices, automatically determines, with respect to each said active connection, whether a different wireless transceiver station has a better wireless signal for communicating with the respective mobile wireless device than said first wireless transceiver station has for communicating with the respective mobile wireless device, and responsive to determining that a different wireless transceiver station has a better wireless signal, automatically passes the respective active connection from said first wireless transceiver station to the different wireless transceiver station having a better wireless signal, said different wireless transceiver station thereafter impersonating the said first wireless transceiver station having the active wireless connection to provide said communications service to the respective mobile wireless device via the respective active connection.

10. The first wireless transceiver station of claim 9,
wherein said device identifier comprises a Media Access Control (MAC) address;
wherein said first wireless transceiver station establishes a respective active connection with each of a plurality of mobile wireless devices by providing a respective virtual MAC address to each said mobile wireless device, the first wireless transceiver station responding to communications from the respective mobile wireless device addressed to the respective said virtual MAC address; and
wherein said first wireless transceiver station passes a respective said connection from itself to a respective said different wireless transceiver station having a better wireless signal by providing the respective virtual MAC address to said different wireless transceiver station having a better wireless signal, the different wireless transceiver station thereafter responding to communications from the respective mobile wireless device addressed to the respective virtual MAC address to impersonate the first wireless transceiver station.

11. The first wireless transceiver station of claim 9, wherein said control function further comprises a neighbor discovery function which automatically determines the identities of a plurality of neighbor wireless transceiver stations by broadcasting a poll by wireless transmission from said first wireless transceiver station, and receiving a respective poll response from each of said plurality of neighbor wireless transceiver stations.

12. The first wireless transceiver station of claim 9, further comprising a network interface for communicating with a network, said network being separate from said wireless transceiver, said wireless transceiver station providing access to said network to said plurality of mobile wireless devices.

13. A distributed apparatus for servicing mobile wireless devices, comprising:
a plurality of wireless transceiver stations coupled to a network and using a common wireless communications protocol for communicating with mobile wireless devices to support access to said network for said mobile wireless devices,
wherein according to said common wireless communications protocol, a wireless communications connection is established between two devices by providing device identifiers of the two devices, wireless communications thereafter including a device identifier of a destination device;
wherein each said wireless transceiver station includes a connection passing function which automatically determines, with respect to each of a plurality of active connections with respective mobile wireless devices, whether a different wireless transceiver station of said plurality of wireless transceiver stations has a better wireless signal for communicating with the respective mobile wireless device than the wireless transceiver station having the active connection has for communicating with the respective mobile wireless device, and responsive to determining that a different wireless transceiver station has a better wireless signal, automatically passes the respective active connection from the wireless transceiver station having the active connection to a different wireless transceiver station having a better wireless signal, said different wireless transceiver station thereafter impersonating the wireless transceiver station having the active wireless connection to provide said communications service to the respective mobile wireless device via the respective active connection.

14. The distributed apparatus of claim 13,
wherein said device identifier comprises a Media Access Control (MAC) address;
wherein each said wireless transceiver station establishes a respective active connection with a respective mobile wireless device by providing a respective virtual MAC address to said mobile wireless device, the respective wireless transceiver station responding to communications from the respective mobile wireless device addressed to said virtual MAC address; and wherein each said wireless transceiver station passes a respective said connection from itself to a respective said different wireless transceiver station having a better wireless signal by providing the respective virtual MAC address to said different wireless transceiver station having a better wireless signal, the different wireless transceiver station thereafter responding to communications from the respective mobile wireless device addressed to the respective virtual MAC address to impersonate the respective wireless transceiver station which passes the respective connection.

15. The apparatus of claim 13, wherein each said wireless transceiver station further comprises a neighbor discovery function which automatically determines the identities of a plurality of neighbor wireless transceiver stations by broadcasting a poll by wireless transmission from the wireless transceiver station, and receiving a respective poll response from each of said plurality of neighbor wireless transceiver stations.

16. A computer program product for operating a first wireless transceiver station which services mobile wireless devices, comprising:
a plurality of processor-executable instructions recorded on a computer-readable media, wherein said instructions, when executed by at least one processor of at least one digital data device, cause the device to perform the steps of:
establishing a connection between a mobile wireless device and a first wireless transceiver station according to a wireless communications protocol, said connection for providing a communications service to said mobile wireless device;
automatically determining that a second wireless transceiver station has a better wireless signal for communicating with said mobile wireless device than said first wireless transceiver station has for communicating with said mobile wireless device;
responsive to said automatically determining step, automatically passing said connection from said first wireless transceiver station to said second wireless transceiver station, said second wireless transceiver station thereafter impersonating said first wireless transceiver station to provide said communications service to said mobile wireless device via said connection.

17. The computer program product of claim 16, wherein said instructions further cause the device to perform the step of:
automatically determining the identities of a plurality of neighbor wireless transceiver stations by broadcasting a poll by wireless transmission from said first wireless transceiver station, and receiving a respective poll response from each of said plurality of neighbor wireless transceiver stations.

18. The computer program product of claim 16, wherein each wireless communication according to said wireless communications protocol contains a destination identifier identifying a device for which the communication is intended.

19. The computer program product of claim 18,
wherein said destination identifier comprises a Media Access Control (MAC) address;
wherein said step of establishing a connection comprises providing a virtual MAC address to said mobile wireless device, said first wireless transceiver station responding to communications from said mobile wireless device addressed to said virtual MAC address; and
wherein said step of automatically passing said connection from said first wireless transceiver station to said second wireless transceiver station comprises providing said virtual MAC address to said second wireless transceiver station, said second wireless transceiver station thereafter responding to communications from said mobile wireless device addressed to said virtual MAC address to impersonate said first wireless transceiver station.

20. The program product of claim 16, wherein said step of automatically determining that a second wireless transceiver station has a better wireless signal for communicating with said mobile wireless device than said first wireless transceiver station has comprises the steps of:
automatically requesting each of a plurality of neighbor stations to report a respective signal strength for communicating with said mobile wireless device; and
automatically comparing the respective signal strengths determined by said determining step with a current signal strength for communicating with said mobile wireless device of said first wireless transceiver station.

* * * * *